United States Patent [19] [11] 3,873,641

Margotte et al. [45] Mar. 25, 1975

[54] MOULDING COMPOSITIONS CONTAINING A MIXTURE OF A THERMOPLASTIC AROMATIC POLYCARBONATE, A BUTADIENE POLYMER AND A COPOLYMER BASED ON ETHYLENICALLY UNSATURATED MONOMERS

[75] Inventors: Dieter Margotte, Krefeld; Karl-Heinz Ott, Leverkusen; Hermann Schirmer, Krefeld; Günther Kämpf, Krefeld-Bockum; Günter Peilstöcker, Krefeld-Bockum; Hugo Vernaleken, Krefeld-Bockum, all of Germany

[73] Assignee: Bayer Aktiengesellschaft, Leverkusen, Germany

[22] Filed: Dec. 3, 1973

[21] Appl. No.: 421,488

[30] Foreign Application Priority Data

June 9, 1973 Germany............................ 2329546
Oct. 25, 1973 Germany............................ 2353383

[52] U.S. Cl. ................................................ 260/873
[51] Int. Cl............................................. C08g 39/10
[58] Field of Search.......... 260/873, 47 XA, 94.7 R, 260/876

[56] References Cited

UNITED STATES PATENTS 3,130,177 4/1964 Grabowski.......................... 260/873
3,162,695 12/1964 Grabowski.......................... 260/873
3,239,582 3/1966 Keskkula et al. ................. 260/47 X
3,642,946 2/1972 Grabowski.......................... 260/873
3,649,716 3/1972 Childers et al...................... 260/873
3,663,471 5/1972 Schirmer et al. ................... 260/873
3,742,088 6/1973 Holder et al........................ 260/873

*Primary Examiner*—Morris Liebman
*Assistant Examiner*—T. Pertilla
*Attorney, Agent, or Firm*—Connolly and Hutz

[57] ABSTRACT

Thermoplastic moulding compositions of 1. 70–30 % by weight of a thermoplastic, aromatic polycarbonate and
2. 30–70 % by weight of a mixture of
2.1. 10–40 parts by weight of a butadiene polymer with butadiene contents of at least 5 % and
2.2. 90–60 parts by weight of a copolymer of
2.2.1. 95–50 parts by weight of styrene, α-methylstyrene, methylmethacrylate or mixtures thereof and
2.2.2. 5–50 parts by weight of acrylonitrile, methacrylonitrile, methylmethacrylate or mixtures thereof, the moulding compositions containing at least 5 % by weight of the butadiene polymer.

5 Claims, No Drawings

MOULDING COMPOSITIONS CONTAINING A MIXTURE OF A THERMOPLASTIC AROMATIC POLYCARBONATE, A BUTADIENE POLYMER AND A COPOLYMER BASED ON ETHYLENICALLY UNSATURATED MONOMERS

This invention relates to thermoplastic moulding compositions composed of 1. 70–30% by weight of thermoplastic, aromatic polycarbonate and
2. 30–70% by weight of a mixture of
2.1. 10–40 parts by weight of a butadiene polymer containing at least 5% of butadiene and
2.2. 90–60 parts by weight of a copolymer of
2.2.1. 95–50 parts by weight of styrene, α-methylstyrene, methylmethacrylate or mixtures thereof and
2.2.2. 5–50 parts by weight of acrylonitrile, methacrylonitrile, methylmethacrylate or mixtures thereof, the said moulding compositions containing at least 5 % by weight of the butadiene polymer.

The moulding compositions according to the invention may in principle contain any thermoplastic polycarbonates. Polycarbonates are already known. They are generally prepared by reacting dihydroxy or polyhydroxy compounds with phosgene or diesters of carbonic acid. 4,4'-Dihydroxy-diarylalkanes are particularly suitable dihydroxy compounds, including those which carry alkyl groups or chlorine or bromine atoms in the ortho-position to the hydroxyl group. The following dihydroxy-diarylalkanes are preferred: 4,4'-Dihydroxy-diphenylpropane-2,2 (bisphenol A), tetramethyl-bisphenol A, tetrachloro-bisphenol A, tetrabromo-bisphenol A and bis-(4-hydroxyphenyl)-p-diisopropylbenzene. Branched polycarbonates are also suitable. To prepare them, part of the dihydroxy compound, e.g. 0.2 to 2 mols %, is replaced by a polyhydroxy compound. The following are examples of suitable polyhydroxyl compounds: 1,4-Bis-(4',4,2'-dihydroxy-triphenyl-methyl)-benzene, phloro-glucinol, 4,6-dimethyl-2,4,4-tri(4-hydroxyphenyl)-heptene-2; 4,6-dimethyl-2,4,6-tri-(4-hydroxyphenyl)-benzene; 1,-1,1-tri-(4-hydroxyphenyl)-ethane and 2,2-bis-[4,4-(4,4'-dihydroxydiphenyl)-cyclohexyl]-propane.

Polycarbonates of this kind have been described in U.S. Pat. Nos. 3,028,365; 2,999,835; 3,148,172; 3,271,368; 2,970,137; 2,991,273; 3,271,367; 3,208,078; 3,014,891 and 2,999,846. Polycarbonates which have molecular weights of 10,000 to 60,000 are preferred, and in particular those with molecular weights of 20,000 to 40,000.

In a preferred embodiment a mixture of two polycarbonates is used. This mixture contains 50–85 % by weight of a polycarbonate made from a halogen free polyphenol and 15–50 % by weight of a halogen containing polycarbonate of the formula

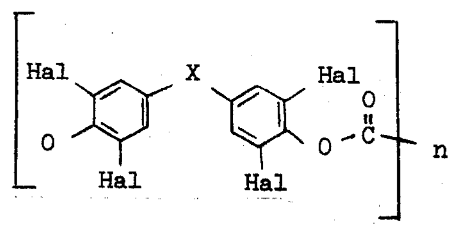

wherein $n$ = 15–200

X = alkylene or alkylidene having 1–5 carbon atoms; cycloalkylene or cyclolalkylidene having 5–15 carbon atoms; a single bond; — 0 —; or

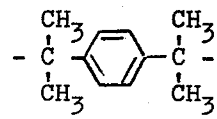

Hal = chlorine or bromine.

The final moulding compositions of this embodiment contain preferably 10 to 30 % by weight of the halogen containing polycarbonate.

As shown by the formula such halogen containing polycarbonates are based on phenols containing at least two benzene nuclei and carrying 4 halogen (chlorine, bromine) atoms. The molecular weights of such polycarbonates are preferably from 16,000 to 35,000. When these polycarbonate mixtures are used the thermal stability and moduli of elasticity found in the products are exceptionally high.

The butadiene polymers which are contained in the moulding compounds are preferably copolymers of 5–95 % by weight butadiene and 70–5% by weight of styrene, acrylonitrile, acrylic acid, methacrylic acid, $C_1$–$C_6$ alkyl esters of acrylic or methacrylic acid (methylmethacrylate is particularly preferred), divinylbenzene and mixtures of these comonomers. Particularly suitable are the copolymers of 70–90% by weight of butadiene and 30–10% by weight of styrene; copolymers of 60–95% by weight of butadiene and 40–5% by weight of methylmethacrylate; copolymers of 30–95% by weight of butadiene and 70–5% by weight of butyl acrylate; and copolymers of 60–80% by weight of butadiene and 40–20% by weight of acrylonitrile. These last mentioned copolymers may also contain small quantities (up to about 10%) of methacrylic acid and/or divinylbenzene incorporated by polymerisation. Examples of terpolymers and quaterpolymers of the last mentioned kind are the copolymers of 63% of butadiene, 34% of acrylonitrile and 3% of methacrylic acid and the copolymers of 60% by weight of butadiene, 36% by weight of acrylonitrile, 3% of methacrylic acid and 1% of divinylbenzene.

The third compound of the moulding compositions according to the invention consists of copolymers of 95–50 parts by weight of styrene, α-methylstyrene, methylmethacrylate or mixtures thereof and 5–50 parts by weight of acrylonitrile, methacrylonitrile, methylmethacrylate or mixtures thereof. Copolymers of this kind which are particularly preferred are the products obtained from about 80 to 60 % by weight of styrene and 20–40 % by weight of acrylonitrile as well as the analogous copolymers obtained from α-methylstyrene.

The moulding compositions according to the invention can be obtained by mixing their components. According to a preferred method of producing them, a latex of the butadiene polymer and a latex of the resinous copolymer are first mixed and the solids are precipitated from the mixed latices and dried. The resulting mixture is then mixed with the polycarbonate, e.g. in a double screw extruder.

According to a preferred embodiment of the invention, the butadiene polymer is present in the form of a network in the combined resin matrix.

The moulding compositions of the invention are suitable for producing any kinds of moulded products, for example by injection moulding. It is particularly advantageous in this moulding process that products with a high weld line strength are formed which can be used for complicated mouldings. In addition, the moulding compositions of the invention have exceptionally high dimensional stability when heated and are resistant to weathering. They are therefore particularly suitable for producing mouldings which are exposed to weathering.

EXAMPLES

EXAMPLES 1–8

The following components were used for producing the moulding compositions which were afterwards tested:

1. a polycarbonate of bisphenol A and phosgene having the relative viscosity $\eta_{rel} = 1.30$ (determined on a solution of 0.5 g of polycarbonate in 100 ml of methylene chloride at 25°C) and a molecular weight of $M_w$ = approx. 30,000,
2. a polycarbonate based on 94 mols % of Bisphenol A and 6 mols % of tetrabromobisphenol A prepared by the known interface process and having a relative viscosity of $\eta_{rel} = 1.28$ and a molecular weight of $M_w$ = approx. 28,000,
3. a mixture obtained by a joint precipitation of the corresponding latices of 71 parts by weight of a copolymer of 80 % by weight styrene and 20 % by weight of acrylonitrile and 29 parts by weight of a copolymer of 63 by weight of butadiene, 34 % by weight of acrylonitrile and 3 % by weight of methacrylic acid,
4. a mixture obtained by joint precipitation of the latices of 75 parts by weight of a copolymer of 72 % by weight of styrene and 28 % by weight of acrylonitrile and 25 parts by weight of a copolymer of 60 % by weight of butadiene, 36 % by weight of acrylonitrile, 3 % by weight of methacrylic acid and 1 % by weight of divinylbenzene,
5. a mixture obtained by joint precipitation of the latices of 80 parts by weight of a copolymer of 70 % by weight of styrene and 30 % by weight of acrylonitrile and 20 parts by weight of a copolymer of 60 parts by weight of butadiene, 36 % by weight of acrylonitrile, 2 % by weight of methacrylic acid and 2 % by weight of divinylbenzene,
6. a mixture obtained by joint precipitation of the latices, of 70 parts by weight of a copolymer of 72 % by weight of styrene and 28 % by weight of acrylonitrile and 30 parts by weight of a copolymer of 60 % by weight of butadiene, 38 % by weight of acrylonitrile and 2 % by weight of divinylbenzene.

Products 1 and 2 were melted and extruded together and 3–6 were melted and extruded together, using in both cases a double screw extruder at temperatures of 200°–260°C. The higher the polycarbonate content of the mixture, the higher were the operating temperatures employed within the given range.

The proportions in which the components were mixed and the physical properties determined in the moulding compounds are summarized in Table 1.

Table 1

| | | Example 1 | Example 2 | Example 3 | Example 4 | Example 5 | Example 6 | Example 7 | Example 8 |
|---|---|---|---|---|---|---|---|---|---|
| Polycarbonate (1) | Parts by weight | 40 | 50 | 60 | 70 | 40 | 40 | 40 | — |
| Polycarbonate (2) | do. | — | — | — | — | — | — | — | 50 |
| Mixture (3) | do. | 60 | 50 | 40 | 30 | — | — | — | 50 |
| Mixture (4) | do. | — | — | — | — | 60 | — | — | — |
| Mixture (5) | do. | — | — | — | — | — | 60 | — | — |
| Mixture (6) | do. | — | — | — | — | — | — | 60 | — |
| Butadiene polymer content of the composition % by weight | | 17.4 | 14.5 | 11.6 | 8.7 | 15 | 12 | 18 | 14.5 |
| Elongation at break % (DIN 53455) | | 35 | 52 | 75 | 90 | 34 | 26 | 43 | 45 |
| Modulus of elasticity kp/cm² (DIN 53 455) | | 17,700 | 18,600 | 19,700 | 21,200 | 20,000 | 19,800 | 17,700 | 21,000 |
| Impact strength cm kp/cm² (DIN 53 453) | | | not | | broken | | | | |
| Notched impact strength cm kp/cm² (DIN 53 453) | | 7 | 8 | 14 | 22 | 9 | 8 | 12 | 6 |
| WLS[1] cm kp/cm² (based on DIN 53 453) | | 7 | 6 | 6 | 7 | 7 | 4 | 7 | 6 |
| Vicat number (A) °C (DIN 53 460) | | 130 | 132 | 141 | 145 | 125 | 125 | 127 | 140 |
| Vicat number (B) °C (DIN 53 460) | | 108 | 113 | 123 | 127 | 107 | 110 | 109 | 124 |

[1]WLS=weld line strength was determined as follows: A small standard test bar is produced by injecting the material from two opposite sides so that a weld line is formed at the middle of the bar. The impact strength of this moulding is determined by a method analogous to DIN 53 453.

EXAMPLES 9–14

The following components were used for preparing the moulding compositions which are afterwards tested:

a. a polycarbonate based on Bisphenol A prepared by the phase interface process and having a relative viscosity of $\eta_{rel} = 1.28$ and an average molecular weight of $M_w$ = approx. 28,000, b. a polycarbonate based on 85 mols % of Bisphenol A and 15 mols % of tetrachlorobisphenol A prepared by the phase interface process and having a relative viscosity of $\eta_{rel} = 1.31$ and a molecular weight of $M_w$ = approx. 31,000, c. a polycarbonate based on 90 mols % of Bisphenol A and 10 mols % of tetrabromobisphenol A prepared by the phase interface process and having the relative viscosity $\eta_{rel} = 1.30$ and a molecular weight of $M_w$ = approx. 31,000, d. a mixture, prepared by mutual precipitation of the latices, of 70 parts by weight of a copolymer of 70 % by weight of styrene and 30 % by weight of acrylonitrile having an instrinsic viscosity of $\eta_i = 0.79$ (determined in DMF at 20°C) and 30 parts by weight of a copolymer of 70% by weight of butadiene and 30 % by weight of styrene, e. a mixture, obtained by mutual precipitation of the latices, of 65 parts by weight of a copolymer of 80% by weight of styrene and 20% by weight of acrylonitrile having an intrinsic viscosity of $\eta_i = 0.65$ and 35 parts by weight of a copolymer of 30% by weight of butadiene and 70% by weight of butyl acrylate, f. a mixture obtained by mutual precipitation of the latices, of 60 parts by weight of a copolymer of 70% by weight of styrene and 30% by weight of acrylonitrile having an instrinsic viscosity of $\eta_i = 1.0$ and 40 parts by weight of a copolymer of 80% by weight of butadiene and 20% by weight of methylmethacrylate.

Products (a) to (c) on the one hand are homogenised and extruded with products (e) to (f) on the other hand at temperatures of between 240° and 300°C in double shaft screws.

The proportions in which the components are mixed and the physical properties determined in the moulding compositions are summarized in Table 2.

D) High molecular tetrabromobisphenol-A-polycarbonate — $\eta_{rel}$ = 1,08; $M_w$ = ca. 16.000

E) High molecular tetrabromobisphenol-A-polycarbonate — $\eta_{rel}$ = 1,08; $M_w$ = ca. 35.000

F) Copolycarbonate of 84 mol-% bisphenol A and 16 mol-% tetrachlorobisphenol A — $\eta_{rel}$ = 1,27; $M_w$ = ca. 31.000

G) High molecular tetrachlorobisphenol-A-polycarbonate — $\eta_{rel}$ = 1,12; $M_w$ = 23.000

2. Copolymer mixtures

H. A mixture obtained by joint precipitation of the latices of 71 parts by weight of a copolymer of 80 % by weight styrene and 20 % by weight acrylonitrile and 29 parts by weight of a copolymer of 63 % by weight butadiene, 34 % by weight acrylonitrile and 3 % by weight methacrylic acid;

I. a mixture obtained by joint precipitation of the latices of 80 parts by weight of a copolymer of 70 % by weight styrene and 30 % by weight acrylonitrile and 20 parts by weight of a copolymer of 60 % by weight butadiene, 36 % by weight acrylonitrile, 2 % by weight methacrylic acid and 2 % by weight divinylbenzene;

J. a mixture obtained by joint precipitation of the latices of 70 parts by weight of a copolymer of 72 % by weight styrene and 28 % by weight acrylonitrile and 30 parts by weight of a copolymer of 60 % by weight butadiene, 38 % by weight acrylonitrile and 2 % by weight divinylbenzene.

The following table contains the mixtures of the invention which were made by mixing the components in an internal mixer and their physical data.

Table 2

| | | | Example 9 | Example 10 | Example 11 | Example 12 | Example 13 | Example 14 |
|---|---|---|---|---|---|---|---|---|
| Polycarbonate | (a) | Parts by weight | 40 | 40 | 40 | — | — | 20 |
| Polycarbonate | (b) | do. | — | — | — | 50 | — | — |
| Polycarbonate | (c) | do. | — | — | — | — | 40 | 20 |
| Mixture | (d) | do. | 60 | — | — | 50 | — | — |
| Mixture | (e) | do. | — | 60 | — | — | — | 30 |
| Mixture | (f) | do. | — | — | 60 | — | 60 | 30 |
| Butadiene polymer content of the composition % by weight | | | 18 | 21 | 24 | 15 | 24 | 22.5 |
| Elongation at break % (DIN 53 455) | | | 65 | 80 | 40 | 76 | 40 | 70 |
| Modulus of elasticity kp/cm² (DIN 53 455) | | | 18500 | 23000 | 17100 | 19600 | 17000 | 18200 |
| Impact strength cm kp/cm² (DIN 53 453) | | | | not | broken | not | broken | |
| Notched impact strength cm kp/cm² (DIN 53 453) | | | 11 | 18 | 8 | 13 | 7 | 10 |
| WLS[1] (based on DIN 53 453) | | | 10 | 7 | 9 | 7 | 8 | 8 |
| Vicat Number A (DIN 53 460) °C | | | 131 | 136 | 125 | 133 | 126 | 130 |
| Vicat Number B (DIN 53 460) °C | | | 114 | 125 | 109 | 111 | 110 | 111 |

[1]See under Table 1

EXAMPLE 15

1. Polycarbonates

The viscosities ($\eta_{rel}$) determined in methylenechloride at 25°C at a concentration of 5 g/l; $M_w$ = molecular weight (weight average)

A) Bisphenol-A-polycarbonate — $\eta_{rel}$ = 1,30; $M_w$ = ca. 31.000

B) Copolycarbonate of 80 mol-% bisphenol A and 20 mol-% tetrabromobisphenol A — $\eta_{rel}$ = 1,25; $M_w$ = ca. 30.500

C) Low molecular tetrabromobisphenol-A-polycarbonate — $\eta_{rel}$ = 1,03; $M_w$ = ca. 4.500

Table

| Example | 1 | 2 | 3 | 4 | 5 | 6 | 7 | 8 | 9 |
|---|---|---|---|---|---|---|---|---|---|
| polycarbonate A) | 40 | — | 20 | 20 | 60 | 30 | 50 | — | 40 |
| polycarbonate B) | — | 40 | — | — | — | — | — | — | — |
| polycarbonate C) | — | — | 20 | — | — | — | — | — | — |
| polycarbonate D) | — | — | — | 20 | — | — | — | — | — |
| polycarbonate E) | — | — | — | — | — | 30 | — | — | — |
| polycarbonate F) | — | — | — | — | — | — | — | 50 | — |
| polycarbonate G) | — | — | — | — | — | — | — | — | 10 |
| mixture H) | 60 | 60 | 60 | 60 | — | — | — | — | — |
| mixture I) | — | — | — | — | 40 | 40 | — | — | — |
| mixture J) | — | — | — | — | — | — | 50 | 50 | 50 |
| Vicat A x) °C | 119 | 121 | 120 | 151 | 125 | 153 | 118 | 120 | 148 |
| Vicat B x) °C | 107 | 108 | 106 | 131 | 110 | 132 | 107 | 109 | 129 |
| modulus of elasticity kp/cm² xx) | 17.000 | 17.200 | 17.500 | 24.200 | 19.900 | 25.300 | 18.000 | 18.400 | 24.300 |

x) determined according to DIN 53 460
xx) determined according to DIN 53 455

We claim:

1. A thermoplastic moulding composition comprising 1. 70–30% by weight of a thermoplastic aromatic polycarbonate and
2. 30–70% by weight of a mixture of
   a. 10–40 parts by weight of a butadiene polymer having a butadiene content of at least 30%, the remainder being styrene, acrylonitrile, acrylic acid, methacrylic acid, a $C_1$–$C_6$ alkyl ester of acrylic acid, a $C_1$–$C_6$ alkyl ester of methacrylic acid, divinylbenzene or a mixture thereof and
   b. 90–60 parts by weight of a copolymer of
      i. 95–50 parts by weight of styrene, α-methylstyrene, methylmethacrylate or a mixture thereof and
      ii. 5–50 parts by weight of acrylonitrile, methacrylonitrile, methylmethacrylate or a mixture thereof, said moulding composition containing at least 5% by weight of said butadiene polymer and said thermoplastic aromatic polycarbonate being a mixture of (I) 50–85% by weight of a polycarbonate based on a halogen-free phenol and (II) 15–50% by weight of a halogen-containing polycarbonate of the formula

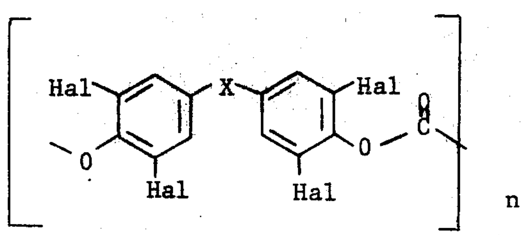

wherein *n* is 15 to 200, X is alkylene or alkylidene having 1 to 5 carbon atoms; cyloalkylene or cycloalkylidene having 5 to 15 carbon atoms; a single bond; —O— or

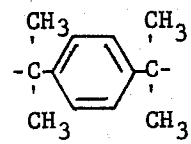

and Hal is chlorine or bromine.

2. A thermoplastic moulding composition as claimed in claim 1, in which the polycarbonate has a molecular weight of from 10,000 to 60,000.

3. A thermoplastic moulding composition as claimed in claim 1 wherein the butadiene polymer is a copolymer of 70 to 90 % by weight of butadiene and 10 to 30 % by weight of styrene.

4. A thermoplastic moulding composition as claimed in claim 1 wherein the butadiene polymer is a copolymer of 30 to 95 % by weight of butadiene and 70 to 5 % by weight of butyl acrylate.

5. A thermoplastic moulding composition as claimed in claim 1 wherein the butadiene polymer is a copolymer of 60 to 80 % by weight of butadiene and 40 to 20 % by weight of acrylonitrile.

* * * * *

Disclaimer

3,873,641.—*Dieter Margotte,* Krefeld; *Karl-Heinz Ott,* Leverkusen; *Hermann Schirmer,* Krefeld; *Gunther Kampf,* Krefeld-Bockum; *Gunter Peilstocker,* Krefeld-Bockum; *Hugo Vernaleken,* Krefeld-Bockum, Germany. MOULDING COMPOSITIONS CONTAINING A MIXTURE OF A THERMOPLASTIC AROMATIC POLYCARBONATE, A BUTADIENE POLYMER AND A COPOLYMER BASED ON ETHYLENICALLY UNSATURATED MONOMERS. Patent dated Mar. 25, 1975. Disclaimer filed May 17, 1983, by the assignee, *Bayer Aktiengesellschaft.*

Hereby enters this disclaimer to all claims of said patent.

[*Official Gazette September 27, 1983.*]